May 16, 1961 F. C. BONTECUE ET AL 2,984,697

PRE-WIRED CIRCUIT PANEL

Filed Dec. 9, 1957 2 Sheets-Sheet 1

United States Patent Office
2,984,697
Patented May 16, 1961

2,984,697

PRE-WIRED CIRCUIT PANEL

Frederic C. Bontecue, Chicago, and Leland A. Bartelheim, Riverside, Ill., assignors to Plastic Precision Parts Co., Chicago, Ill., a partnership Filed Dec. 9, 1957, Ser. No. 701,625
13 Claims. (Cl. 174—68.5)

This invention pertains to electric circuitry and more particularly to improvements over printed circuits and methods of making the same. More particularly, the invention is concerned with the fabrication of a molded wire pattern or pre-wired panel; the method and placement of conductors thereon and their construction; the novel characteristics and arrangements in both the method and article exemplifying improvement over the prior art.

It is well known that printed circuits have come into extensive use in the electronic and other fields because they lend themselves to greater miniaturization simplification and accuracy, and also simplify assembly, minimize rejects, and improve consistency of production, testing and performance. Particularly at the solder-connection level they are amenable to dip-soldering operations whereby hand soldering procedures are avoided and a resultant cost saving realized. The printed circuit itself however is a relatively expensive item and the cost thereof has, to some extent, limited and prevented the use of printed circuits in a great number of environments. The high cost of printed circuits has a two-fold cause. First, the insulating panels or boards employed in the fabrication thereof are quite expensive and secondly, and of much greater significance, the cost of printing the circuits thereon which is now largely effected by printing, electroplating and etching techniques is quite high and the number of rejects is substantial because of poor printing registration with the holes in the board which is present in the printing process. For further consideration of printed circuits reference is hereby made to the November 1957 issue of Plastics World, page 14 and following.

In light of this background, we have conceived a molded wire pattern or pre-wired panel which represents a substantial improvement in structure and concept over the printed circuits and panels heretofore known and the provision thereof is one of the objects of this invention.

In further view of this background, another object of the invention is to provide a method of fabricating a pre-wired circuit and panel therefor that results in a striking reduction in cost over printed circuits; in fact in many instances reduces the cost to less than one-half of those now available and eliminates rejects by providing perfect duplication of the circuit arrangement with respect to electrical components and their requirements on each and every board.

Still another object of the invention is that of providing a method of making a pre-wired circuit that eliminates the waste of conductor material and eliminates the cost heretofore involved in recovering excess conductor material etched from printed circuits for re-use. Furthermore, not only is the amount of solder used confined to that which is needed in connecting components to the printed wires, but various additional thicknesses of conductor material and solder can be provided as required with each conductor and also the air gap or leakage resistance between two adjacent connectors is improved by being disposed on ribs above the base. Moreover, electrical barriers can be placed wherever required by circuit design.

Yet another object is to provide a pre-wired panel having structural characteristics that lend themselves to realizing the cost savings described in connection with the fabrication objectives.

The invention is characterized by a panel having multiple-level construction of significant elements, for example of bi-level and tri-level configurations whereupon equipping such panels with circuit patterns is an accurate, simple and inexpensive procedure as is also the proper location and connection of circuit components thereto.

Still a further object is to provide a panel of the character described which is strong and sturdy because of the multiple-level features thereof; that has connectors of different thicknesses, ventilation openings; molded indicia legends of various types formed as integral parts thereof; the use of inexpensive materials having good heat and dielectric characteristics, which are readily modified either in their formation or subsequent thereto for accommodating circuit variations; that can have mounting elements and other structural components formed as integral parts thereof; and, that has a number of additional features and advantages elaborated in detail hereinafter.

Yet a further object of the invention is to provide a method of making a pre-wired circuit and panel wherein the panel therefor is molded with a conductor supporting pattern formed integrally therewith as part of the molding operation and is raised above the plane of the panel at one or more levels whereby the subsequent steps of equipping the conductor supporting pattern with metal conductors in connecting circuit components thereto is greatly facilitated in manufacture, assembly and servicing.

Additional objects and advantages will become apparent as the description proceeds.

Embodiments of the invention both as to the method and structural features thereof are exemplified in the accompanying drawings, in which.

Figure 1:
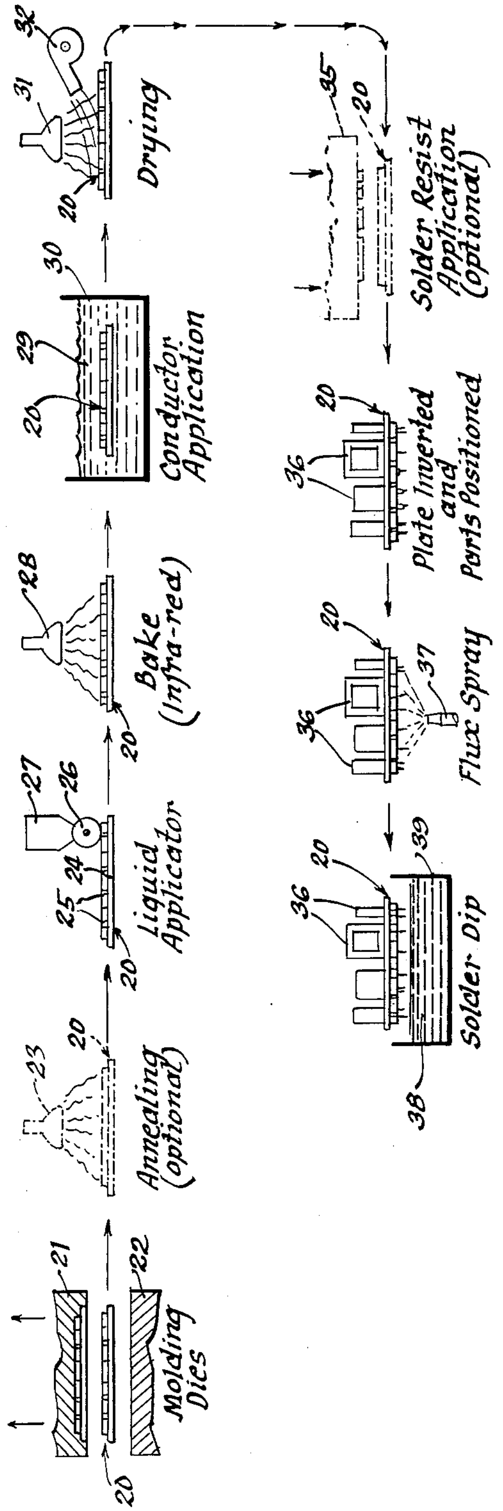
Fig. 1 is a diagrammatic view showing the various steps in a method of manufacture embodying the invention.
Figure 2:
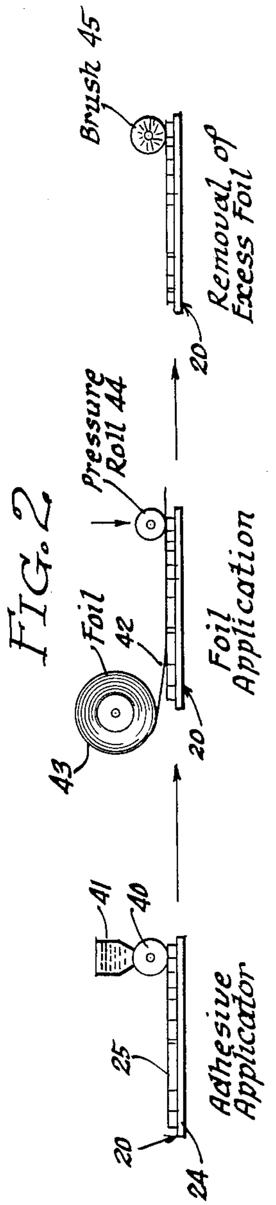
Fig. 2 is a diagrammatic view illustrating certain steps in a modified method embodying the invention.

Since the general characteristics of printed circuits and the panels thereof are well known in the art it is believed that the description of the invention will best be understood by considering first the exemplifications of the method of fabrication process shown in Figs. 1 and 2. In these figures the panel is designated with the numeral 20 and is a molded component, formed in the dies 21 and 22. An injection molding technique is preferred in making the panel 20, although it is not essential because any of the other well known molding procedures may be followed if desired. The material from which the panel is formed should have good heat and dielectric properties and may be a thermo plastic, thermo setting plastic or plastic impregnated cements and ceramics. Examples of suitable materials are polystyrene, Bakelite C11, Cymac 400 and phenolic and melamine materials.

If a thermo plastic material is used it will ordinarily be necessary to anneal the panel 20 to improve the heat characteristics thereof, so that the panel has the capacity of resisting the temperature of low melting point solders. More pointedly, thermo plastic materials will melt or soften if the temperature thereof is elevated appreciably above about 220° F. and since a temperature of this order may not be sufficiently high, an annealing operation may be employed to improve the same. The annealing step may be conventional and the time and temperatures involved will depend upon the particular material selected for making the panel 20. The annealing step is illustrated in Fig. 1 by the heater 23 which is in the form of an infra red bulb and the temperature resistivity thereafter ranges upwardly around 260° F.

Before proceeding to a description of the next step, it should be pointed out that the panel 20 comprises a base 24, equipped at least on one side thereof with raised ribs 25 that define a circuit pattern. Since the panel is an integral unit the base and rib patterns are both formed in the molding operation along with other structural elements not shown here but described in later views. The panel in such form is passed beneath a roller 26 operatively associated with a reservoir 27 and as the roller traverses the upper surfaces of the ribs 25 a layer or coating of a bonding agent is applied thereto. The agent is contained within the reservoir 27 and as the roller 26 rotates it is coated with such material and then transfers same to the ribs 25.

In the process shown in Fig. 1, the bonding agent is of a very special type and is referred to in the trade as an ionized ink and comprises an ink or agent which, after it has been dried, attracts metal such as copper thereto when submerged in a solution of soluble metal. The more noble the metal, the easier to process a ceramic powder, ionized to obtain the desired attraction of the metal to be deposited. The ionized powder is mixed with a liquid having an affinity to the surface on which it is applied. Thus, the process thereafter contemplates the step of drying or baking the ink as represented by the infra red heater 28.

Following the baking of the bonding agent, the panel 20 with the baked ink coating on the rib pattern thereof is submerged in a solution 29 contained within a tank or reservoir 30. The solution 29 also has special characteristics and in general may be described as being a metal applying solution. The panel is maintained in the solution until the ink is completely coated or covered with metal that is attracted from the solution by the dried ink and adheres thereto to the desired thickness. Commercially, the ink and solution constitute what is known as the Fruth and Sherer coating process for which patents have been applied and for purposes of describing this invention it is believed that no further description of these products is necessary since it is in commercial production at the present time.

Figures 10, 11, 13:
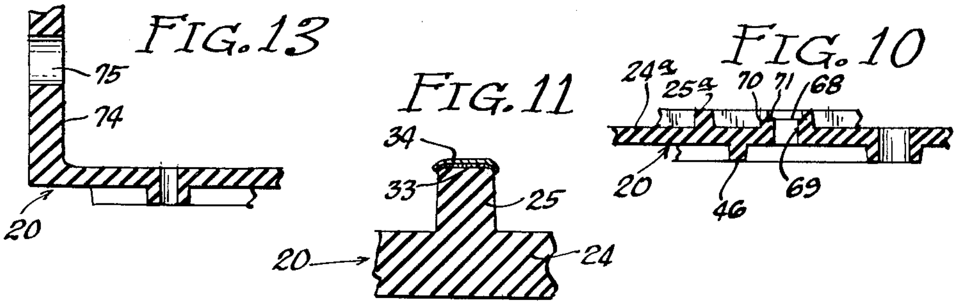
Fig. 10 is an enlarged broken sectional view showing another portion of the panel of Fig. 3.
Fig. 11 is a greatly enlarged vertical sectional view of a conductor equipped rib of the panel shown in Figs. 3 and 4.
Fig. 13 is also an enlarged broken vertical sectional view showing another feature of the panel.

Following the copper coating of the ink the panel 20 is dried as by means of a heater 31 and blower 32. After drying, it is found that the rib pattern 25 has a copper conductor extending along each elevated surface thereof, a portion of the panel in this form is depicted in Fig. 11 and for purposes of identification the ink coating is designated with the numeral 33 and the copper conductor adhering thereto with the numeral 34. It will be readily apparent that copper is confined to areas where needed and need not be etched. In connecting circuit components to the conductors it is desirable to minimize the quantity of solder required, and to achieve this result the portions of the conductors 34 intermediate the ends or points of component connection thereto where heavy currents are not carried may be coated with a "solder resist" material. This step is illustrated in Fig. 1 by the solder resist applicator 35. The applicator 35 may take any suitable form.

The panel 20 is now ready to have circuit components mounted thereon. The placement of the components may be performed manually or by machine. In either event the panel will first be inverted and the various components 36 appropriately located and dropped into place thereon. As is known, the components are equipped with depending terminals that extend through openings provided therefor in the panel 20, at the ends of the ribs 25 thereof and in close proximity to the copper conductors 34 on the underside of the panel 20. The terminals of the components 36 project therebeyond appreciably and the assembly is coated with a solder flux as by means of a flux spray nozzle 37. The assembled unit is then dip soldered. This comprises dipping the underside thereof momentarily in molten solder 38 contained within a heated tank 39. The solder adheres to the terminals of the components 36 and to the surrounding portions of the conductors which were not coated with a solder resist material. In the event that a solder resist is not applied the solder will coat all of the conductors in their entirety. After the solder solidifies, the process is completed and the product ready for installation in a cabinet.

Alternate steps of the process are illustrated in Fig. 2. They are concerned with the application of the metal conductor to the rib pattern. Since the panel is the same as the one illustrated in Fig. 1, the numeral 20 is again employed to designate the same. The panel 20 after the formation thereof is passed under an applicator roller 40 associated with a reservoir 41 containing a liquid adhesive therein. The roller 40 deposits a coating of adhesive on the upper surfaces of the rib pattern 25 as the roller traverses the panel. Next, a thin sheet of copper or other metallic conductor 42 is fed from a parent roll 43 onto the adhesive coated ribbed pattern of the panel 20 and is pressed thereagainst by a roller 44. The roller 44 forces the foil sheet 42 into intimate contact with the adhesive coating on the rib pattern and consequently the foil adheres thereto.

After the adhesive cures, the excess foil is removed from the panel by any suitable means such as the brush 45. Since the foil sheet 42 is thin the portions thereof that do not adhere to the panel, that is, those portions which are intermediate the various ribs 25 readily break free and are removed from the panel thereby leaving clean, uniform conductors extending along the upper surfaces of the various ribs. The panel 20 is now substantially the same character as the panel shown in Fig. 1 following the drying step represented by the heater 31 and blower 32, wherefore Fig. 11 correctly shows the panel formed in accordance with the process shown in Fig. 2 as well as the panel formed by the process of Fig. 1.

Figs. 3 through 13 inclusive will now be considered in particular in discussing the structural characteristics of the rib pattern construction and the panel 20 thereof. The panel shown in Figs. 3 and 4 has a circuit pattern on the underside thereof (Fig. 3) but not along the upper side thereof as is clear from Fig. 4. However, the invention contemplates the provision of a panel equipped with a rib pattern on both sides as shown in Fig. 10. Since the panel of Fig. 10 constitutes a modification it is denoted with the numeral 20*a*, the base thereof with the numeral 24*a*, the ribs on the underside with the numeral 25*a* and the elevated ribs on the opposite side thereof are denoted with the numeral 46. In all other respects the panel 20*a* may be identical to the panel 20 and may be fabricated in accordance with the methods described with reference to Figs. 1 and 2. It will be apparent, however, that the additional steps must be included in such methods of coating the ribs 46 with a suitable bonding material and covering the bonding material with a metallic conductor and a separate soldering operation is contemplated after the dipping for the first soldering operation.

The elevated ribs 25 define what may be termed a rib pattern or carrier pattern for the metal conductors. Consequently, the ribs form maze or labyrinth type elements extending from point to point on the base 24 of the panel. It is necessary that a number of the ribs comprise one or more bends or turns therealong and such turns may be arcuate, may be angular as shown at 47, or, may have any other suitable configurations. Each rib will have one or more connector terminals or sockets 48 therealong at which point the various circuit components such as resistors, capacitors, tube sockets, etc., may be connected thereto.

Figure 3:
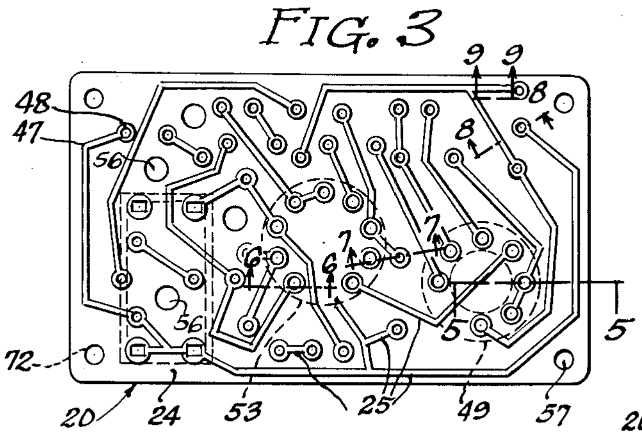
Fig. 3 is a bottom plan view of a printed wire panel formed in accordance with the invention.
Figure 5:
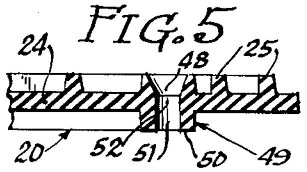
Fig. 5 is an enlarged broken sectional view taken along the line 5—5 of Fig. 3.
Figure 4:
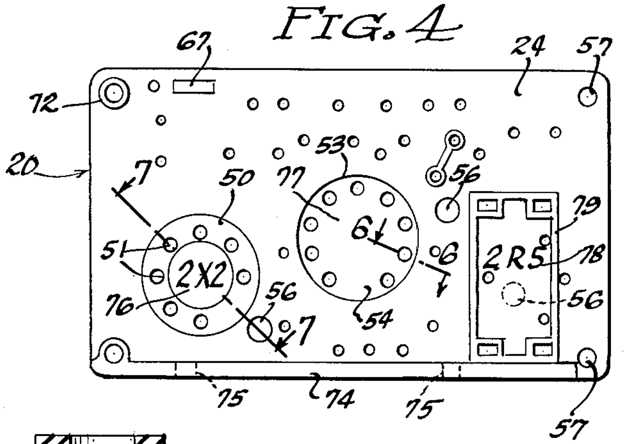
Fig. 4 is a top plan view of the panel illustrated in Fig. 3.
Figure 7:
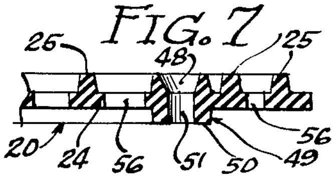
Fig. 7 is an enlarged broken sectional view taken along the line 7—7 in Fig. 3.

The socket 48 is a generally frusto-conical configuration converging toward the base 24 and as illustrated most clearly in Fig. 5, the connector socket 48 forms one of the seven terminal retaining openings defining the tube socket mounting 49 illustrated in Figs. 3 and 4. The socket 49 is also defined along the opposite side of the panel 20 by a cylindrical abutment 50 extending outwardly from the plane of the base 24. The abutment 50 has a plurality of spaced openings 51 therein communicating respectively with openings 52 aligned therewith and provided by the base 20 which correspondingly are in alignment with respective frusto-conical sockets 48. Thus, a continuous opening is defined through the abutment, base and ribs at locations appropriately oriented for identifying and receiving the respective terminals of a tube socket in proper relationship and the frusto-conical contour not only assists in leading or guiding the prongs of the electrical components into the openings but also serves as a small solder pot for an excellent soldered connection.

Figure 6:
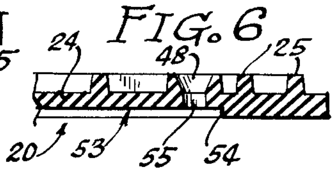
Fig. 6 is an enlarged broken sectional view taken along the line 6—6 in Fig. 3.

Fig. 6 illustrates in detail the tube socket mounting 53 shown in Figs. 3 and 4. The socket mounting differs slightly from the socket 49 heretofore described in that it is defined by a generally cylindrical recess or recessed seat 54 formed in the base 24 of the panel. Thus, a tube socket can nest partially or seat within the recess 54 which as a result forms a mounting guide therefor. The socket mounting 43 is for a nine pin tube socket as shown in Fig. 4 and the base 24 is provided with an opening 55 therethrough for each of the nine connector sockets 48.

In some areas it is desirable to provide ventilation openings through the panel 20 and such openings may be formed integrally therein as a part of the panel molding process. A number of such openings are shown in Figs. 3 and 4 and in sectional detail in Fig. 7 and the numeral 56 is used to identify the same. Also the panel may be provided with an opening 57 at appropriate corners thereof to permit mounting of the panel by means of screws or bolts in a casing.

Figure 8:
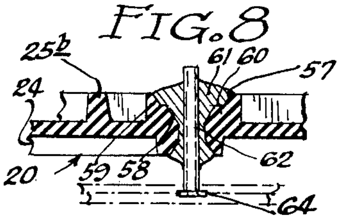
Fig. 8 is an enlarged broken sectional view taken along the line 8—8 in Fig. 3 illustrating wherein a tri-level conductor is provided and with a component shown as ultimately soldered in place.

So far the panel as heretofore described relates to multiple-level rib structures and may be characterized as high level panels in that the base 24 defines one level and the ribs 25 define a second level. Certain of the ribs where solder is not used as additional conductive material are illustrated in Fig. 8, and may be characterized as a tri-level rib in that the base 24 thereof forms one level, the ribs 25*b* form a second level and the conductor socket 57, because of its configuration, defines a third or intermediate level. It will be apparent from the following description that the socket 57 may also be referred to as a modified component or alternatively the ribs 25*b* may be considered as modified elements if used exclusively on any particular panel, but no matter how viewed the structural inter-relation thereof is the same.

In either event the socket 57 is of stepped configuration having an inner frusto-conical portion 58 substantially identical to the connector socket 48 shown in Fig. 5 and an outer mouth or well 59 also a frusto-conical configuration but of greater cross-sectional dimension than the portion 58. Thus the portions 58 and 59 meet at a shoulder 60 which forms the third level of the panel 20. This construction is advantageous in that it facilitates the application of a solder resist material to the conductors along the uppermost surfaces of the ribs 25*b* whereupon in a dip soldering operation the solder will not adhere to such coated conductors but will only adhere within the socket connectors 57. Numeral 61 in Fig. 8 identifies a solder material connecting the printed conductors of the ribs 25*b* with a terminal 62 of a component (not otherwise shown) having a conventional laminated construction wherein terminals 62 have laterally turned heads 64 anchored between the adjacent laminations. However, the laminations may be representative of any other suitable components.

Figure 9:
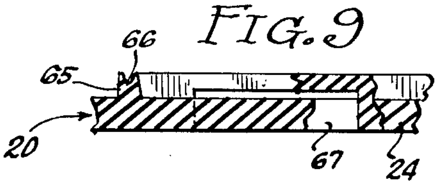
Fig. 9 is an enlarged broken sectional view taken along the line 9—9 in Fig. 3 showing a breakaway section of conductor for alternate wiring.

The portion of the panel 20 shown in Fig. 9 illustrates a rib 65 that has a concave channel 66 along the upper surface thereof adapted to contain the metallic conductor therein. With same, solder in an amount and shape to form a heavy wire conductor is picked up in various thicknesses depending on shape and size of the channel 66. Further, Fig. 9 shows how a circuit pattern provided by the panel 20 may be modified simply whenever it is necessary to interrupt a connection between two points along a raised rib. One manner in which this may be done is simply to break out a portion of the rib. Such an action may be facilitated by forming the rib as a bridge extending across a recessed area 67 in the base 24 of the panel. With such a configuration it will be apparent that the rib may be broken out or removed by hot iron with ease. Another manner in which this type may be accomplished is to provide an insert in the mold used to fabricate the panel since such an insert if properly located would interrupt the selected rib or ribs making the same discontinuous.

The portion of panel 20 shown in Fig. 10 shows a socket 68 construction which is quite similar to the socket 57 shown in Fig. 8. Along with the base and ribs it forms a tri-level panel, the only variation in the socket 68 is that both the inner portion 69 and outer portion 70 thereof are each substantially cylindrical rather than frusto-conical. However, the outer portion 70 has a greater diameter than the inner portion 69 so that the socket is stepped and defines an intermediate shoulder 71 which forms the third level of the panel to receive extra solder as a solder well.

Figure 12:
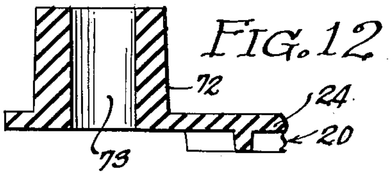
Fig. 12 is an enlarged broken vertical sectional view showing another feature of the panel.

It is often necessary to mount relatively heavy components such as transformers, coils, etc. on a panel as well as mounting the panel carrying such weight. Fig. 12 shows a reinforcement in the form of an integral boss 72 provided at the corner of the panel 20. The boss 72 has an opening 73 extending therethrough and through the base 24 of the panel which is adapted to pass a rivet or bolt therethrough. It will be apparent that the opening 73 may be threaded so that a cap screw can be used to mount a component to the boss and panel, if desired.

As heretofore indicated, it may be necessary to mount the pre-wired panel to some other structure such as a casing or cabinet and in the panel shown in Figs. 3 and 4 such mounting may be accomplished by a mounting bracket formed integrally with the panel as shown in Figs. 4 and 13. The bracket in Fig. 13 is designated with the numeral 74 and it is seen to have an opening 75 therethrough adapted to receive a bolt, rivet or other mounting means.

Components such as tube sockets, resistors, capacitors, coils, etc. are mounted upon printed panels by hand although in some instances automation equipment is employed for such purpose. In any hand operation the chance for error is relatively great and quite frequently printed circuits do not function properly and must be rejected because the components have been incorrectly positioned thereon. As a consequence the circuit interconnections are improper. In order to minimize and substantially avoid this difficulty the pre-wired panel made of the present invention may be provided with indicia, key ways, contour devices and other elements as an integral part thereof which will identify the location of the various circuit components so that a workman can see at a glance where such components belong and cannot improperly mount them. Illustrated indicia device of such character are shown in Fig. 4. As, for example, the notation 76 identifying the seven-prong socket mounting, the notation 77 used in conjunction with the nine-prong socket mounting, notation 78 and the guide members 79. It will be apparent that the panel shown in Figs. 3 and 4 is of simplified construction and that in the usual circuit pattern embodiment a plurality of seven, eight and/or nine tube sockets will be employed as well as a plurality of each of the other conventional circuit components.

The panels described are characterized by having a number of advantages both in terms of structural characteristics and economy in manufacture. The panels can be made rapidly of either thermo plastic or thermo setting materials. Thermo plastic is preferred unless extra high heat resistant properties are desired, in which case thermo setting materials may be used. Thus, the material compositions are inexpensive yet can have high dielectric and high heat resistant properties for almost every application. The carrier pattern for the conductors is formed as an integral part of the board or panel in the molding thereof as are mounting brackets and bosses, if needed, and various mounting indicia if desired including legends, seats or recesses, elevated abutments, guides and keys, etc. Thus, as part of a single molding operation a number of features that will facilitate, simplify and decrease the cost of further fabrication are integrally incorporated therein.

The multiple-level characteristics of the panel materially simplify equipping the same with metal conductors and in thereafter connecting various circuit components to these conductors. The elevated orientation of the rib or carrier pattern permits ready coating of the upper surfaces thereof with a bonding material to which the metallic conductors adhere and in the subsequent coating of such metal conductors with a solder resist material. Further, the channels, wells or recesses formed in the connector and sockets in tri-level panels define solder pots that collect and confine the solder globules therein with the result that there is no solder wastage. Thus, in general, there is substantial savings in metal both of the solder and of the material forming the conductors yet various thicknesses of metal may be provided where desired.

The panel is a ruggedly strong unit since the ribs serve as reinforcements and is provided with such without increasing the quantity of material from which it is formed. Ventilation where desired can thus be provided without weakening the panel. Moreover, a stronger circuit is provided in that the metal conductors have a relatively uniform width throughout the length thereof and consequently there are no relatively narrow or thin circuit portions that are easily broken or create resistance to current flow. As a corollary thereof the conductors are not excessively wide at points therealong and thereby waste metal is eliminated. It may be noted, particularly with reference to Fig. 11, that the metal conductors follow to some extent the arcuate corners of the ribs 25 and although the projected width thereof is at most no greater than the width of the upper surface of the ribs, yet the actual width is greater where it extends down the sides of the ribs whereby the circuit is stronger and affords lesser resistance without bringing into dangerously close proximity adjacent conductors which would increase the likelihood of arcing thereacross in high voltage applications.

Moreover, leakage resistance is reduced due to greater surface distance and instead of a 300,000 ohm leakage resistance experienced with printed boards, such resistance can be at practically infinity with materials and construction embodied in the present invention.

While in the foregoing specification embodiments of the invention have been described in considerable detail for purposes of making an adequate disclosure, it will be apparent to those skilled in the arts that numerous changes may be made in such details without departing from the spirit and principles of the invention.

What is claimed is:

1. A pre-wired electrical circuit board comprising a generally planar base, a plurality of raised reinforcing ribs extending outwardly from the plane of said base and formed integrally therewith of a dielectric material, said ribs extending longitudinally in different directions, and metal conductors secured to and along the tops of said ribs defining a conductor pattern for electrical component connections.

2. The circuit board of claim 1 in which some of said ribs along the outer surfaces thereof have flat top surfaces supporting the conductors with slightly arcuate convex edges.

3. The circuit board of claim 1 in which some of the ribs have concave outer surfaces defining longitudinally extending channels with the conductors secured therein formed of extra thickness in their middle.

4. The circuit board of claim 1 in which component contour guides are formed integrally with said base to facilitate the orientation and the mounting of electrical components thereon.

5. The circuit board of claim 1 wherein said base is provided with a void beneath a portion of one of the ribs in alignment therewith, said rib portion comprising a frangible bridging element across said void to interrupt the continuity of the conductor carried thereby when broken away.

6. The circuit board of claim 1 in which a spacer sleeve boss is formed integrally with said base on the side thereof opposite to said ribs to receive a mounting element therein for a member supported a distance spaced from said base.

7. The circuit board of claim 1 in which the reinforcing ribs and conductors thereon extend outwardly from the plane of the base on opposite sides thereof.

8. In a pre-wired chassis, a base, a plurality of ribs projecting from said base having substantially flat top portions and being oriented and arranged to define a coplanar pattern for conductors, said base and rib being formed integrally with each other and of a material having good dielectric properties, each of said ribs having a socket connector therealong adapted to receive the terminal of a circuit component, and a thin electrical conductor secured only along the top surface of each of said ribs to form a printed circuit pattern.

9. The chassis of claim 8 in which at least certain of said socket connectors are provided with a well therein enlarged at the conductor and forming a solder pot around a component terminal, the bottom of the well defining with said ribs and base a tri-level chassis.

10. The chassis of claim 8 in which said socket connectors define wells having a generally frusto-conical configuration.

11. The chassis of claim 8 in which said socket connectors define wells having a generally cylindrical configuration.

12. In a pre-wired panel of the character described, a multi-level conductor pattern comprising a generally planar base provided with a plurality of raised ribs formed integrally therewith of a material having good dielectric properties, said ribs being arranged to extend in many directions, metal conductors carried by said ribs and defining a circuit pattern, said ribs and conductors having socket connectors provided with wells therein defining solder pots and opening through the base in alignment therewith for connecting the terminals of a circuit component to the metal conductors carried by the ribs, said conductors extending into the wells of the socket connectors and along only the top surfaces of each of said ribs in secured relationship therewith.

13. The pre-wired panel of claim 12 in which the outer surfaces of the ribs have arcuate edges, the conductors following the contour of the ribs generally along the outer surfaces and the arcuate edges thereof to produce conductors having a greater width than the width of the outer surfaces of said ribs.

References Cited in the file of this patent

UNITED STATES PATENTS

| | | |
|---|---|---|
| 421,734 | Lindenmann | Feb. 18, 1890 |
| 2,427,144 | Jansen | Sept. 9, 1947 |
| 2,434,541 | Bierer | Jan. 13, 1948 |
| 2,474,988 | Sargrove | July 5, 1949 |
| 2,512,310 | Corson | June 20, 1950 |
| 2,535,674 | Franklin | Dec. 26, 1950 |
| 2,700,719 | Coler et al. | Jan. 25, 1955 |
| 2,701,890 | Moor | Feb. 15, 1955 |
| 2,740,193 | Pessel | Apr. 3, 1956 |
| 2,745,436 | Battle | May 15, 1956 |
| 2,757,443 | Steigerwalt | Aug. 7, 1956 |

FOREIGN PATENTS

| | | |
|---|---|---|
| 686,445 | France | July 25, 1930 |
| 828,668 | Germany | Jan. 21, 1952 |

OTHER REFERENCES

Introduction to Printed Circuits; Swiggett. Rider Publishing Co. 1956.

"Annealing Injection-Molded Styrene" (Dunlap et al.), published in Modern Plastics, August 1950 (pages 83, 86, 88, and 89 relied on).